United States Patent [19]

Matsumoto et al.

[11] Patent Number: 5,291,420
[45] Date of Patent: Mar. 1, 1994

[54] REMOTE MANAGEMENT SYSTEM FOR PHOTOGRAPHIC EQUIPMENT

[75] Inventors: Fumio Matsumoto; Tooru Mori, both of Tokyo, Japan

[73] Assignee: Fugi Photo Film Co., Ltd., Kanagawa, Japan

[21] Appl. No.: 656,654

[22] Filed: Feb. 19, 1991

[30] Foreign Application Priority Data

| Feb. 19, 1990 | [JP] | Japan | 2-39133 |
| Feb. 19, 1990 | [JP] | Japan | 2-39134 |
| Feb. 19, 1990 | [JP] | Japan | 2-39135 |
| Feb. 19, 1990 | [JP] | Japan | 2-39136 |

[51] Int. Cl.⁵ .......................................... G06F 15/20
[52] U.S. Cl. .................................... 364/525; 355/204
[58] Field of Search ................... 364/525, 558, 551.01, 364/564, 571.01, 571.04, 186, 550; 371/15.1, 29.1; 355/203, 204, 205, 207, 208, 200; 340/825.5

[56] References Cited

U.S. PATENT DOCUMENTS

| 4,065,661 | 12/1977 | Jaskowsky | 355/6 |
| 4,348,099 | 9/1982 | Fantozzi | 355/208 |
| 4,496,237 | 1/1985 | Schron | 364/550 |
| 4,617,661 | 10/1986 | Futaki et al. | 371/29.1 |
| 4,881,095 | 11/1989 | Shidara | 355/27 |
| 4,903,016 | 2/1990 | Murai et al. | 340/825.5 |
| 4,910,557 | 3/1990 | Imai | 355/208 |
| 4,933,707 | 6/1990 | Matsumoto | 355/27 |
| 4,956,669 | 9/1990 | Nakamura | 355/207 |
| 5,018,143 | 5/1991 | Platteter et al. | 371/29.1 |
| 5,084,875 | 1/1992 | Weinberger et al. | 371/29.1 |
| 5,087,940 | 2/1992 | Altmann | 355/204 |
| 5,089,848 | 2/1992 | Kusuda et al. | 355/206 |
| 5,212,519 | 5/1993 | Kasahara et al. | 355/200 |
| 5,220,380 | 6/1993 | Hirata et al. | 355/204 |

OTHER PUBLICATIONS

Patent Abstracts of Japan, vol. 9, No. 113, May 1985 & JP-A-60 000 448.
British Kinematography Sound and Television Society Journal, vol. 66, No. 2, Feb. 1984, pp. 58-60, N. Varian, "A Computerized Film Laboratory: Economic Reality or Futuristic Dream".

*Primary Examiner*—Jack B. Harvey
*Assistant Examiner*—Ellis B. Ramirez
*Attorney, Agent, or Firm*—Sughrue, Mion, Zinn, Macpeak & Seas

[57] ABSTRACT

A printer processor, a film processor, and a densitometer are connected to a personal computer via a port controller. To diagnose the operational condition of photographic apparatus, the apparatus forms a check sample. The check sample is sent to the densitometer to fetch the measured density data into the personal computer. If the operational condition of the photographic apparatus is abnormal, the personal computer fetches the operational data under management in the photographic apparatus to determine a countermeasure for the abnormal state. The countermeasure is transferred to the photographic apparatus to adjust the adjust failure element automatically. In order to control a plurality of lab shops remotely, each lab shop is provided with a sub-computer connected to the photographic apparatus. The headquarters are provided with a main computer storing therein a management program. The main computer fetches the data of the sub-computer via a communication line. In accordance with the fetched data, the headquarters control the quality, production state, and stock stage of consumable goods at each lab shop remotely. The port controller finds the idle time of a CPU at each lab shop, and fetches the data from the photographic apparatus during the idle time.

19 Claims, 14 Drawing Sheets

REMOTE MANAGEMENT SYSTEM FOR PHOTOGRAPHIC EQUIPMENT

BACKGROUND OF THE INVENTION

The present invention relates to a system for remotely controlling the operation of photographic apparatus and the production and quality at a lab shop, and more particularly to a remote management system suitable for centralized management of a plurality of minilab shops.

Compact and economical photographic apparatus (such as a printer processor and a film processor), called a minilab, recently has come into widespread use. Such minilab equipment often is installed, for example, within a supermarket at a minilab department (minilab shop) to provide photoprinting services as a sideline. Even an operator having relatively little photofinishing knowledge can make a properly finished (photoprint) using minilab equipment having automated functions.

It is necessary to check and adjust photographic apparatus in order to attain proper photoprint quality. Minilab equipment usually is operated by an operator with insufficient photofinishing knowledge to perform such checking and adjustment properly. Therefore, photofinishing sometimes may be carried out under improper equipment conditions. Such a situation also may occur even at a large lab having a number of experts, if a number of reasons for needing checking and adjustment are complicated. In order to ensure proper photoprint quality, an operational condition management system or a quality management system may be provided independently to both a minilab shop and a large lab to analyze trouble or an adjustment failure of photographic apparatus. This management system is constituted by a personal computer and an analysis program, and is used at the start of daily work. In using this management system, a control strip supplied from a film maker is first developed in a printer processor. Then, the developed control strip is measured with a densitometer to obtain density data. The density data is inputted to a personal computer through its keyboard so that the operational condition of a processor in the printer processor can be diagnosed from the finished quality of the control strip. If the operational condition is abnormal, the causes of trouble or adjustment failure are analyzed and displayed on the screen of the personal computer. The operator checks the displayed causes and adjusts the processor to have a proper condition. Therefore, it is therefore possible to make a good quality photoprint quality by using the printer processor which recovered a normal operational condition.

The operational condition is different with photographic apparatus in an actual photoprinting system. Such operational data (setting data and measured data) specific to each photographic apparatus has not been supplied to the above-described management system, so that it has not been possible to effect checking and adjustment suitable for each photographic apparatus. Further, the conventional management system is intended to be used for analyzing trouble and adjustment failure for the case of a standard production state. Accordingly, although the conventional management system can analyze trouble and adjustment failure caused by temporary changes, it cannot analyze trouble and adjustment failure caused by a difference of production amount and contents correctly.

Photographic apparatus is operated under automatic control in accordance with various preset data so that measured data becomes the same as the preset data. Various data preset for the photographic apparatus can be used for quality management, production management, consumable goods management, operational condition management, operational condition history record, analysis of trouble and adjustment failure, and the like. Generally, photographic apparatus and a personal computer will have different data formats, and data communication is not possible during operation of photographic apparatus. For these and other reasons, the conventional management system uses photographic apparatus and a personal computer offline. Therefore, it becomes necessary for an operator to input data into a personal computer through its keyboard, and adjust the photographic apparatus in accordance based on the analyzed causes.

For production management of each photographic apparatus, a method has been adopted for noting a number of finished products, e.g., the number of filmstrips for a film processor or the number of photoprints for a printer processor, and thereafter summing the numbers on the note. However, this method does not provide proper production management, because of the possibility of forgetting to write the number on a note or missing a note. Furthermore, an operator of a minilab shop of a chain orders consumable goods, such as color paper and processing solution, from the headquarters when necessary. It has been difficult to order such goods at the right time, given considerations such as delivery time and the like. Further, the headquarters cannot manage production at a plurality of lab shops collectively.

SUMMARY OF THE INVENTION

In view of the foregoing, it is one object of this invention to provide a remote management system capable of analyzing the operational conditions of photographic apparatus or the quality of photoprints precisely by taking the state of each photographic apparatus into consideration.

It is another object of this invention to provide a remote management system capable of analyzing the operational conditions and qualities of photographic apparatus precisely by taking production data into consideration.

It is a further object of this invention to provide a remote management system capable of automatically and remotely adjusting photographic apparatus as necessary after diagnosis.

It is a still further object of this invention to provide a remote management system capable of providing precise production management and a timely order of consumable goods to headquarters.

It is another object of this invention to provide a remote management system capable of managing production of each lab shop at headquarters collectively.

It is a further object of this invention to provide a remote management system capable of entering data, under management of photographic apparatus, into a personal computer without hindering the operation of the photographic apparatus.

The foregoing and other objects of this invention are achieved by connecting a photographic apparatus and a densitometer to a computer, e.g., a personal computer; measuring a check sample made by the photographic apparatus with the densitometer; entering, in online fashion, the measured density data into the computer;

and diagnosing the operational condition of the photographic apparatus or the quality of a photoprint by analyzing the measured density data If the operational condition of the photographic apparatus is abnormal, data is picked up from the photographic apparatus to determine a countermeasure, which then is transmitted back to the photographic apparatus to adjust the operational conditions. The photographic apparatus may be a film processor, a printer processor, a photofinishing reception unit and the like as minilab equipment. At a large lab it may be a film processor, a printer, a paper processor, a negative film analyzer, a notch puncher, and the like. According to the present invention, various data of a photographic apparatus is transferred in online fashion to a computer so that, by referring to the data, an optimum countermeasure for an abnormal operational condition can be determined using a management program stored in the computer. An optimum countermeasure specific to each photographic apparatus can be determined automatically so that even an operator with insufficient photofinishing knowledge can provide precise operational management.

According to a preferred embodiment of this invention, each lab shop is installed with a sub-computer, such as a personal computer, which is connected to a photographic apparatus and a densitometer. Production data from the photographic apparatus and density data from the densitometer are entered into the sub-computer. This sub-computer is connected via a communication line to a main computer at the headquarters. The main computer at the headquarters fetches data from the sub-computer, and analyzes the measured density data by using a management program stored in the main computer while taking production data into consideration, so as to diagnose the operational condition of the photographic apparatus and the quality of a photoprint. In this embodiment, photographic apparatus at each of a chain of lab shops are managed collectively by the main computer at the headquarters, thereby providing consistent quality at each lab shop.

According to another preferred embodiment of this invention, a sub-computer fetches production data of a photographic apparatus to manage production and to determine the amount of consumable goods currently available. When a predetermined amount of consumable goods have been consumed, the sub-computer orders consumable goods online from the main computer at headquarters via a communication line. According to this embodiment, the headquarters can manage the production states of lab shops collectively. Since each lab shop orders consumable goods from the headquarters automatically, timely ordering is possible by taking delivery time into consideration.

According to a further embodiment of this invention, each photographic apparatus and peripheral apparatus is connected via a port controller to a computer such as a personal computer. This port controller is constructed of a switch unit, a first communication control unit, a buffer memory, a subject communication discriminator unit, a data format converter unit, and a second communication control unit. The switch unit selects a photographic apparatus for data communication therewith from a plurality of photographic apparatus. The first communication control unit checks an idle time of a central processing unit (CPU) built in the selected photographic apparatus and performs data transfer during the idle time at the data transfer speed of the CPU. The buffer memory stores data picked up irregularly from the photographic apparatus. The subject communication discriminator unit discriminates whether the data in the buffer memory to be transferred to the computer is the data of the photographic apparatus requested by the computer. The data format converter unit converts the data read from the buffer memory into the data format of the computer. The second communication control unit transfers data in blocks to the computer at the data transfer speed of the computer. According to this embodiment, a photographic apparatus and a computer having different data formats can be connected to each other online. Further, data of the photographic apparatus can be entered into the computer without hindering the operation of the photographic apparatus.

BRIEF DESCRIPTION OF THE DRAWINGS

The above and other objects and advantages of this invention will become apparent to the person skilled in the art from the following detailed description of the invention when read in conjunction with the accompanying drawings, in which.

DETAILED DESCRIPTION OF THE PREFERRED EMBODIMENTS

Figure 1:
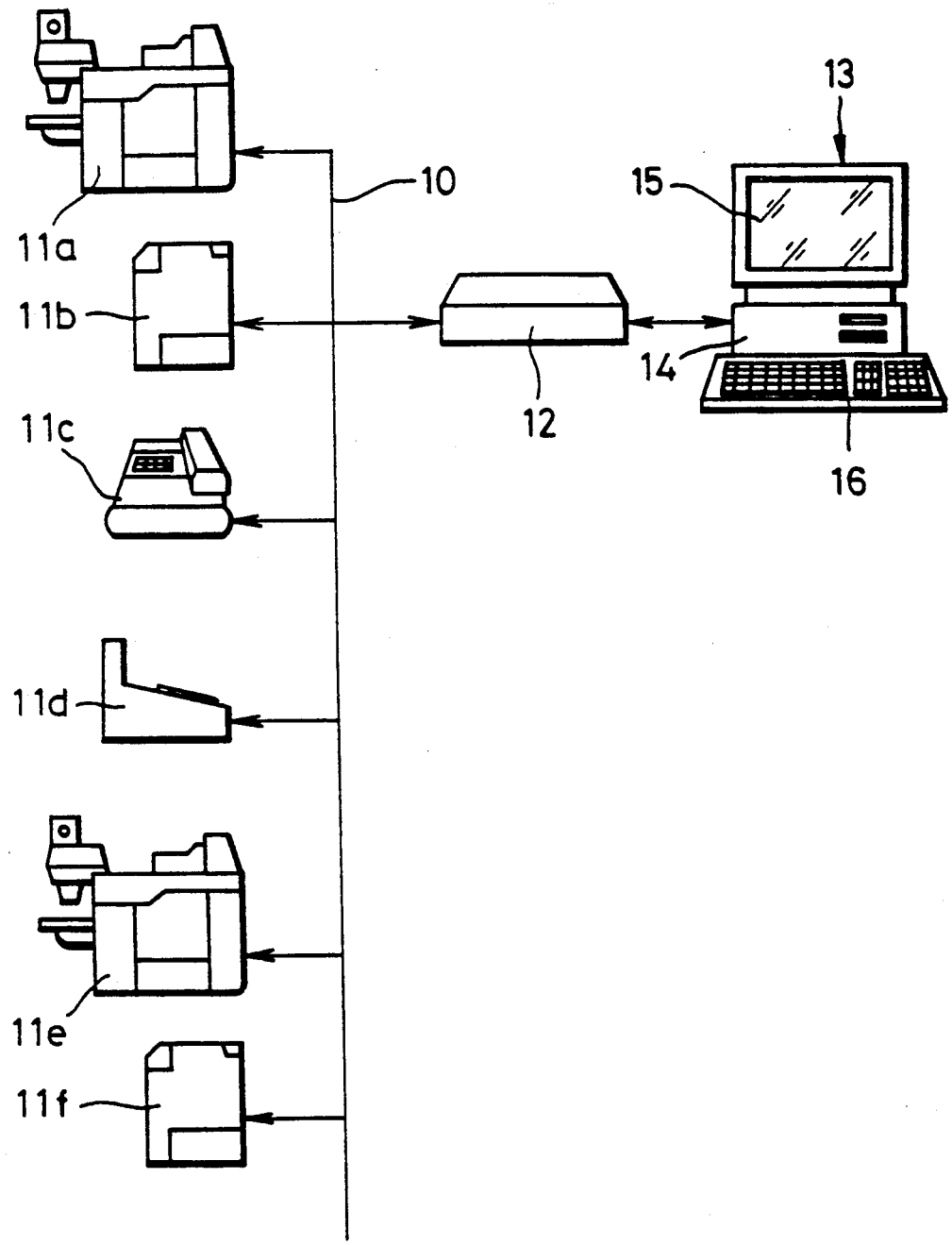
FIG. 1 is a schematic illustration of a remote management system of this invention.

Referring to FIG. 1 showing the outline of the present invention, a plurality of photographic apparatus and peripheral equipment are connected to a bus line 10. In this embodiment, two printer processors 11a and 11e, two film processors 11b and 11f, a densitometer 11c, and a photofinishing reception apparatus 11d are connected to a bus line 10. The printer processors 11a and 11e and film processors 11b and 11f store various preset data, and are operated in accordance with these data. The preset data, and data which are measured either regularly or irregularly, are supplied via a port controller 12 to a computer, e.g., a personal computer 13. Data is transferred a little at a time to the port controller 12 during an idle time of CPUs built into the printer processors and film processors so as not to intercept the operation thereof.

When one block of data is collected, the port controller 12 discriminates the data while referring to the ID data assigned to each photographic apparatus. If the data is proper, its format is converted and transferred to the personal computer 13. The densitometer 11c measures the density of a check sample made by the printer processors 11a, 11e and film processors 11b, 11f when the operational conditions thereof are checked. The measured density data is supplied via the port controller 12 to the personal computer 13. It is necessary to know which photographic apparatus made the check sample, so that the measured density data, together with the ID data of the photographic apparatus, are sent to the personal computer 13.

At least one printer processor and one film processor are required for photoprinting, and one densitometer is required for operational condition checking. Therefore, the two processors and one densitometer preferably constitute one set. Each set is connected to the port controller 12. As is well known, the personal computer 13 is constructed of a personal computer main unit 14, a monitor 15, and a keyboard 16. According to a management program, the personal computer 13 manages the operational condition of each photographic apparatus such that each photographic apparatus is adjusted by updating the preset data so as to provide optimum photofinishing, and that if adjustment is impossible, an alarm is generated.

Figure 9:
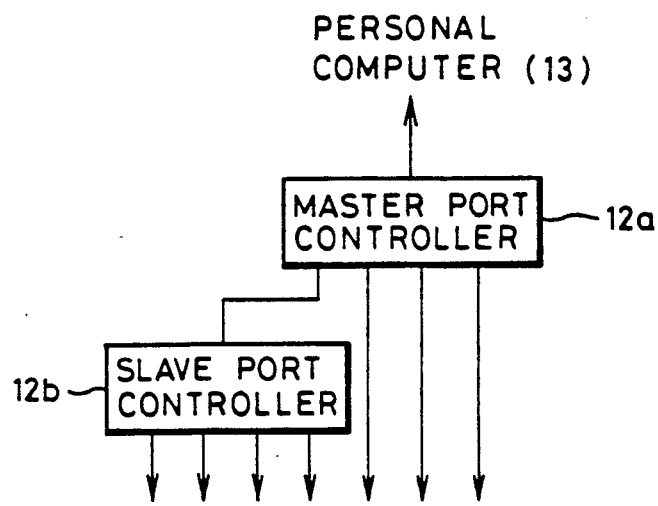
FIG. 9 is a block diagram of an embodiment wherein seven photographic apparatus are connectable using two port controllers.
Figure 10:
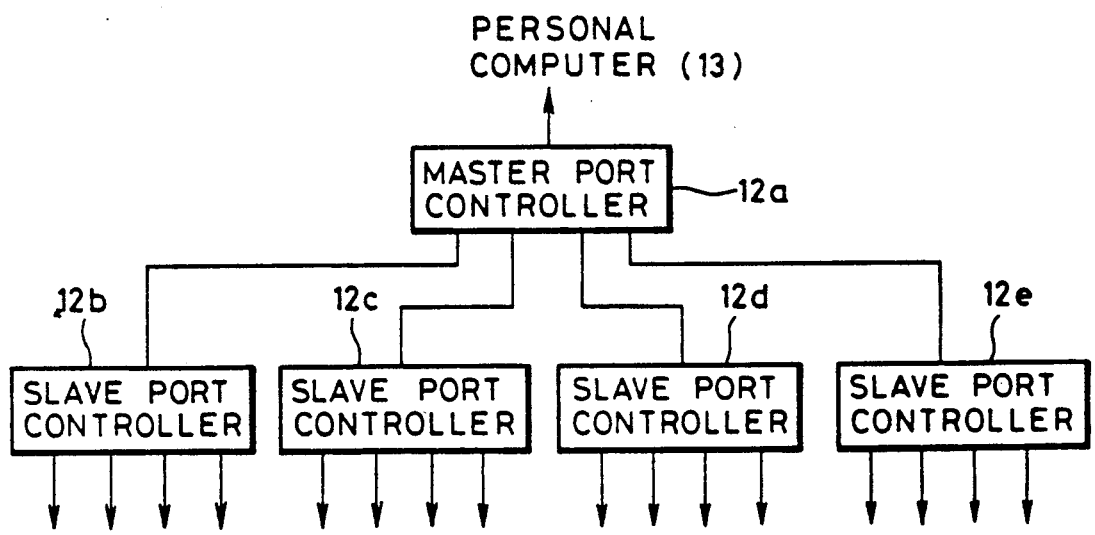
FIG. 10 is a block diagram showing another embodiment wherein sixteen photographic apparatus are connectable using five port controllers.

In many cases, the number of minilabs installed in an ordinary minilab shop is four or fewer. Therefore, it is advantageous from the viewpoint of cost and operational efficiency that the maximum number of apparatus connectable to the port controller 12 be limited to four. For a relatively large minilab shop or the like having five or more photographic apparatus and peripheral devices, a corresponding plurality of port controllers each having the limited connection number of four are used to manage the devices with one personal computer, as shown in FIG. 9 or 10. In FIG. 9, one master port controller 12a and a slave port controller 12b connected to the master port controller 12a are used to manage a total of seven photographic apparatus and peripheral devices. In FIG. 10, four slave port controllers 12b to 12e and one master port controller 12a are used to manage a total of sixteen photographic apparatus and the like.

Figure 2:
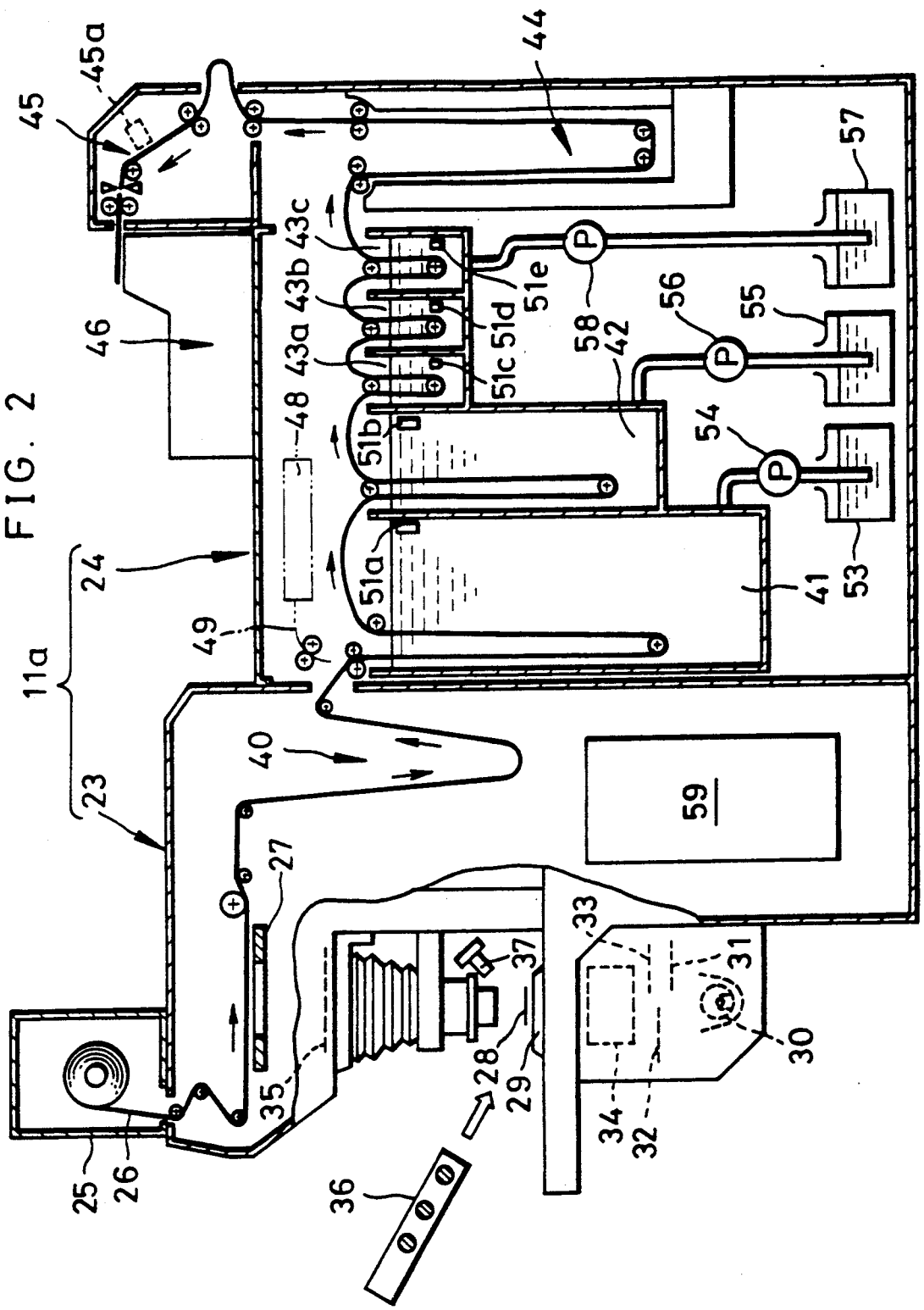
FIG. 2 is a schematic diagram showing the printer processor of FIG. 1.

As shown in FIG. 2, a printer processor 11a is constructed of a printer 23 for printing an exposed frame, and a processor 24 for development. Color paper 26 wound in a roll is contained within a magazine 25 mounted on the printer 23. This color paper 26 is pulled out from the magazine 25 one frame after another and conveyed to an exposure station provided with a paper mask 27. A frame of a negative film 28 is printed within the frame of the color paper 26 at the exposure stage. This negative film is held by a film carrier 29 and illuminated by a printing light radiated from a lamp 30. In order to adjust the proportion and intensity of three color components of the printing light, a cyan filter 31, a magenta filter 32, and a yellow filter 33 are disposed in the optical path by insertion amounts which are controlled in accordance with a printing exposure amount.

The printing light passed through the color correction filters 31 to 33 is mixed sufficiently in a mixing box 34, and thereafter is applied to the negative film 28. A shutter 35 stays open for a predetermined time during printing exposure.

In setting an exposure condition, a test print is carried out using a control negative film (Bull's eye negative film) 36. As well known, at least three Bull's eyes of normal, over, and under exposure are formed. The control negative film 36 is set on the film carrier 29 to make a test photoprint. The exposure condition setting data is corrected such that the density of the test photoprint becomes equal to that of a reference photoprint. There is another method of correcting the exposure condition setting data by means of round exposure of the control negative film 36. According to this method, round exposure is conducted at density correction or color corrections by predetermined steps to make, e.g., nine test photoprints, and the number of the most properly finished one is selected and inputted so as to correct the exposure condition setting data. A photometry sensor 37 is disposed obliquely above the film carrier 29 to measure the three color densities and lamp light amount for the negative film 28.

The exposed color paper 26 is sent to the processor 24 via a looper 40. A developing tank 41, a fixing tank 42, rinsing tanks 43a to 43c, a dryer unit 44, a cutter unit 45, and a sorter unit 46 are provided within the processor 24. The exposed color paper 26 passes through respective tanks at a predetermined speed to undergo developing, fixing and rinsing processes. After these photofinishing processes, a drying process, a frame cutting process, and a sorting process are performed for each order.

A control paper strip, supplied from a film maker, is used to manage the operational condition of the processor 24. This control paper strip 49 is formed with an unexposed area, an under exposed area, and an over exposed area on a color paper, and is housed in light-tight fashion within a cassette 48. The cassette 48 is loaded within the processor 24 and the control paper strip 49 therein is guided into the processing tanks and is developed. The developed control paper strip 49 is measured with the densitometer 11c so that the operational condition of the processor 24 can be diagnosed based upon the density of the finished control paper strip 49. If a densitometer is built in the printer processor 11a, a check sample can be measured automatically with this built-in densitometer. In this case, a densitometer 45a is mounted, for example, at the cutter unit 45 to measure the reflection density of a check sample after the drying process.

Temperature sensors 51a to 51e are mounted within the above-described tanks, as is well known, for detecting the temperature of each processing solution, heaters for heating each processing solution up to a predetermined temperature, and other devices. The developing tank 41 is supplemented with a fresh developing solution contained within a reserve tank 53 by a pump 54 in accordance with the paper processing amount. Reserve tanks 55 and 57 contain fresh fixing solution and rinsing solution, respectively, which are supplemented by means of pumps 56 and 58 to the fixing tank 42 and rinsing tanks 43a to 43c, respectively, in accordance with the paper processing amount. The rinsing tanks 43a to 43c are cascade-connected in succession. Reference numeral 59 represents a control circuit board.

Figure 3:
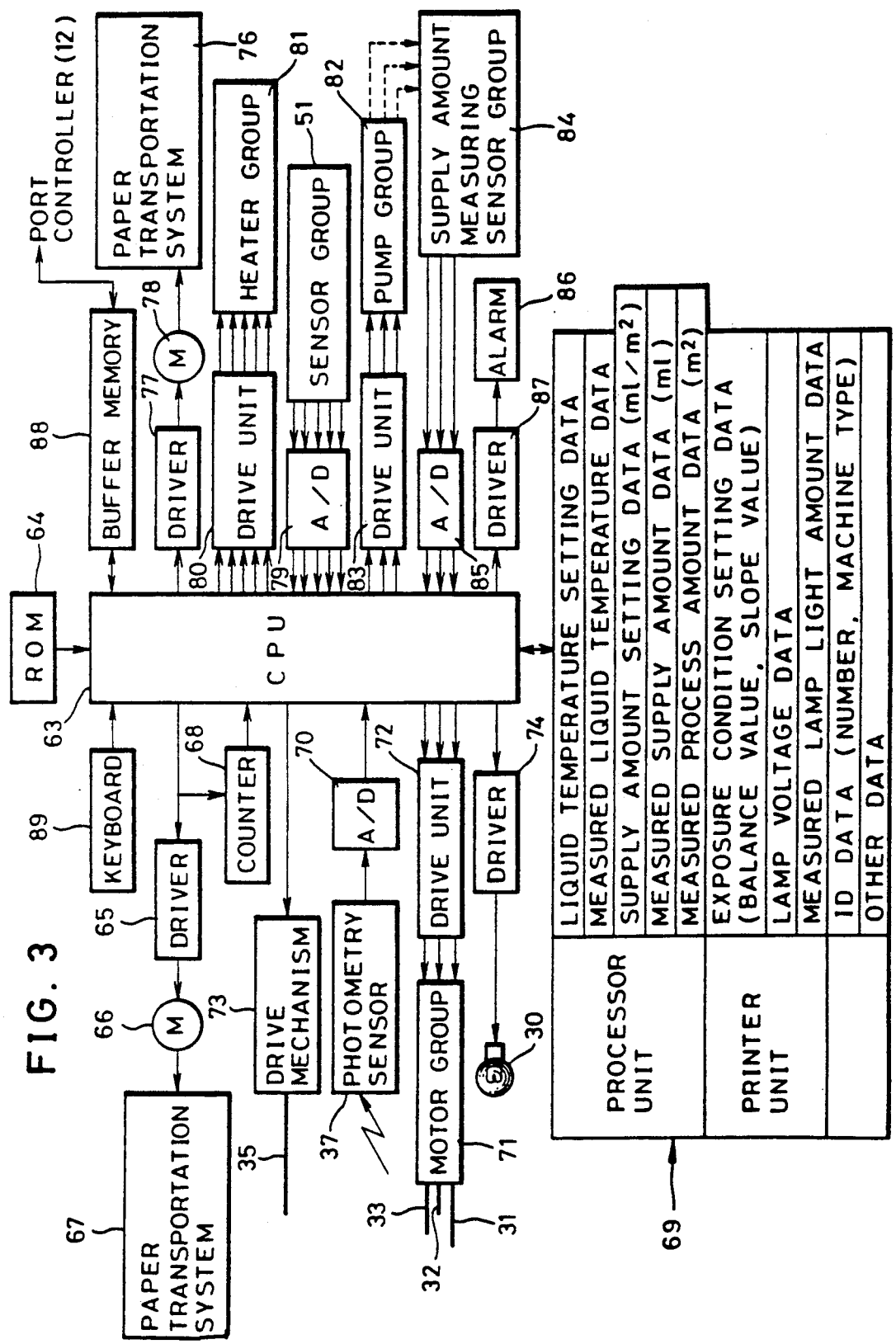
FIG. 3 is a block diagram showing the electric circuit arrangement of the printer processor of FIG. 2.

FIG. 3 shows the circuit arrangement of the printer processor. A CPU 63 controls the circuit elements in accordance with a control program stored in read-only memory (ROM) 64. CPU 63 causes a pulse motor 66 to rotate by supplying drive pulses to a driver 65, so as to drive a paper transportation system 67 constructed of a number of rollers shown in FIG. 2. Since the rotation amount of the pulse motor 66 corresponds to the paper processing amount, a counter 68 counts drive pulses after setting a paper in the correct position. The contents of the counter 68 are fetched by CPU 63 which then obtains the processing amount for each type of paper. Production data such as the processing amount for each paper type, the number of prints for each print size, the number of prints for each film type, and the like are written in random access memory (RAM) 69.

A photometry sensor 37 measures the light passed through the negative film 28 or control negative film 36 by means of three color separation photometry. An output signal of the photometry sensor 37 is converted into a digital signal by an analog-to-digital (A/D) converter 70 and is sent to CPU 63 to calculate three color exposure amounts or to check the lamp light amount. A motor group 71 is constructed of three pulse motors to drive the color correction filters 31 to 33, the rotation of the motor group 71 being controlled by CPU 63 via a drive unit 72. The shutter 35 opens or closes the printing optical path by means of a driving mechanism 73. A driver 74 operates the lamp 30.

In the paper transportation system 76 mounted within the processor 24, a motor 78 connected to a driver 77 transports the exposed color paper 26 at a predetermined speed. A temperature sensor group 51, constructed of the five temperature sensors 51a to 51e shown in FIG. 2, measures the solution temperature within respective processing tanks. The five measured solution temperatures are converted into digital signals by an A/D converter 79 and are supplied to CPU 63 which then writes them in RAM 69 as the measured solution temperature data. If the measured solution temperature of the developing solution, for example, is lower than the solution temperature setting data, the heater mounted on the developing tank 41 among the heater group 81 is powered via a drive unit 80 to heat the developing solution up to a preset temperature.

A pump group 82, constructed of the pumps 54, 56 and 58 shown in FIG. 2, is driven by a drive unit 83 in accordance with the total paper processing amount. A supply amount measuring sensor group 84, constructed of three sensors mounted on the pumps 54, 56, and 58, measures the supply amount of each processing solution in accordance with the drive amount of the pumps. The obtained supply amount is converted into a digital signal by an A/D converter 85 and is written in RAM 69.

An alarm 86 is driven by CPU 63 via a driver 87 to generate a sound, light or the like to warn an operator, when an abnormal state occurs during the operational of the printer processor 11a, or any adjustment failure occurs due to inability of automatic adjustment by the personal computer 13.

Setting data and various measured data obtained at predetermined time intervals or obtained when the personal computer 13 requests it, respectively, are written in RAM 69 as operational data for operating the printer processor in a normal condition. This operational data and the above-described production data are fetched by the personal computer 13 via the port controller 12, and are used for determining a countermeasure against adjustment failure, production management, and the like. Instead of RAM 69, an LSI card or the like may be used. In order to carry out the operation by the photographic apparatus preferentially, a data request command and the like from the port controller 12 are stored temporarily in a buffer memory 88 until an idle time of CPU 63 occurs. A keyboard 89 supplies various operation commands and data to CPU 63.

Figure 4:
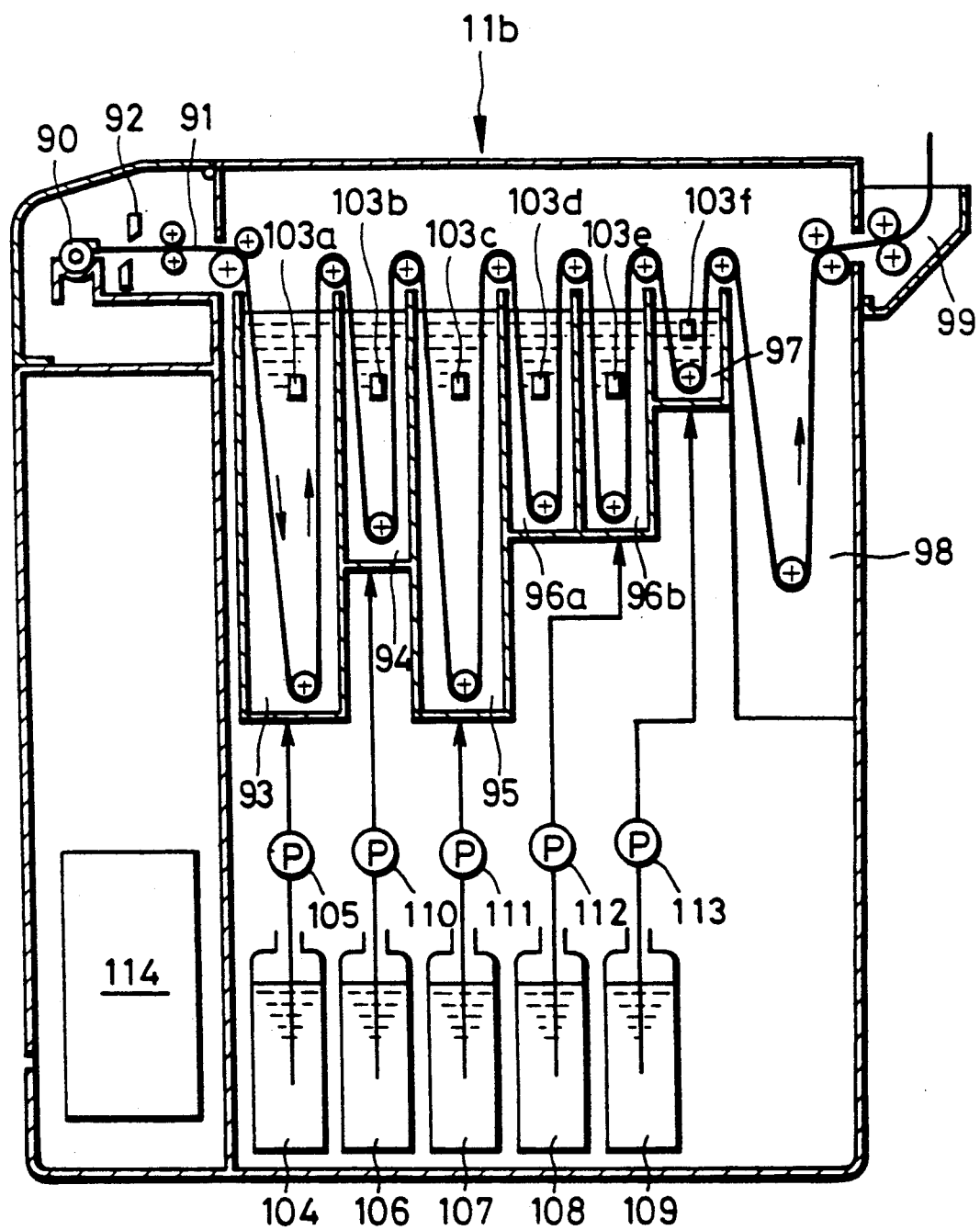
FIG. 4 is a schematic diagram showing the film processor of FIG. 1.

Referring to FIG. 4 showing the film processor 11b, a film cassette 90 requested to be printed is set at a pull-out stage. After almost all the exposed negative film 91 within the film cassette 90 is pulled out, a cutter 92 is activated to cut the trailing portion of the negative film 91. The exposed negative film 91 passes at a predetermined speed through a color developing tank 93, a bleaching tank 94, a bleach/fixing tank 95, rinsing tanks 96a and 96b, and a stabilizing tank 97 to undergo the color developing process, bleaching process, bleach/fixing process, rinsing process, and fixing process sequentially. After these photofinishing processes, the negative film 91 is sent through a dryer unit 98 to a film stocker 99.

A control film strip, supplied by a film maker, formed with an unexposed area, an under exposed area, and an over exposed area on a negative film, and contained in a film cassette, is used to manage the operational condition of the film processor 11b. The control film strip is developed similarly to ordinary negative film. The developed control film strip is measured with the densitometer to diagnose the operational condition of the film processor 11b based upon the density of the finished strip.

Within the above-described processing tanks, temperature sensors 103a to 103f are mounted to detect the temperature of each processing solution. Heaters are provided to heat each processing solution up to a predetermined temperature. Solution surface detectors and other devices also are mounted within the processing tanks. Fresh color developing solution contained within a reserve tank 104 is supplied to the color developing tank 93 by a pump 105 in accordance with the paper processing amount. Reserve tanks 106 to 109 also contain respective fresh solutions which are supplied through pumps 110 to 113 to the bleaching tank 94, bleach/fixing tank 95, rinsing tanks 96a and 96b, and stabilizing tank 97, respectively, in accordance with the film processing amount. The rinsing tanks 96a and 96b are cascade-connected successively. Reference numeral 114 represents a control circuit board.

Figure 5:
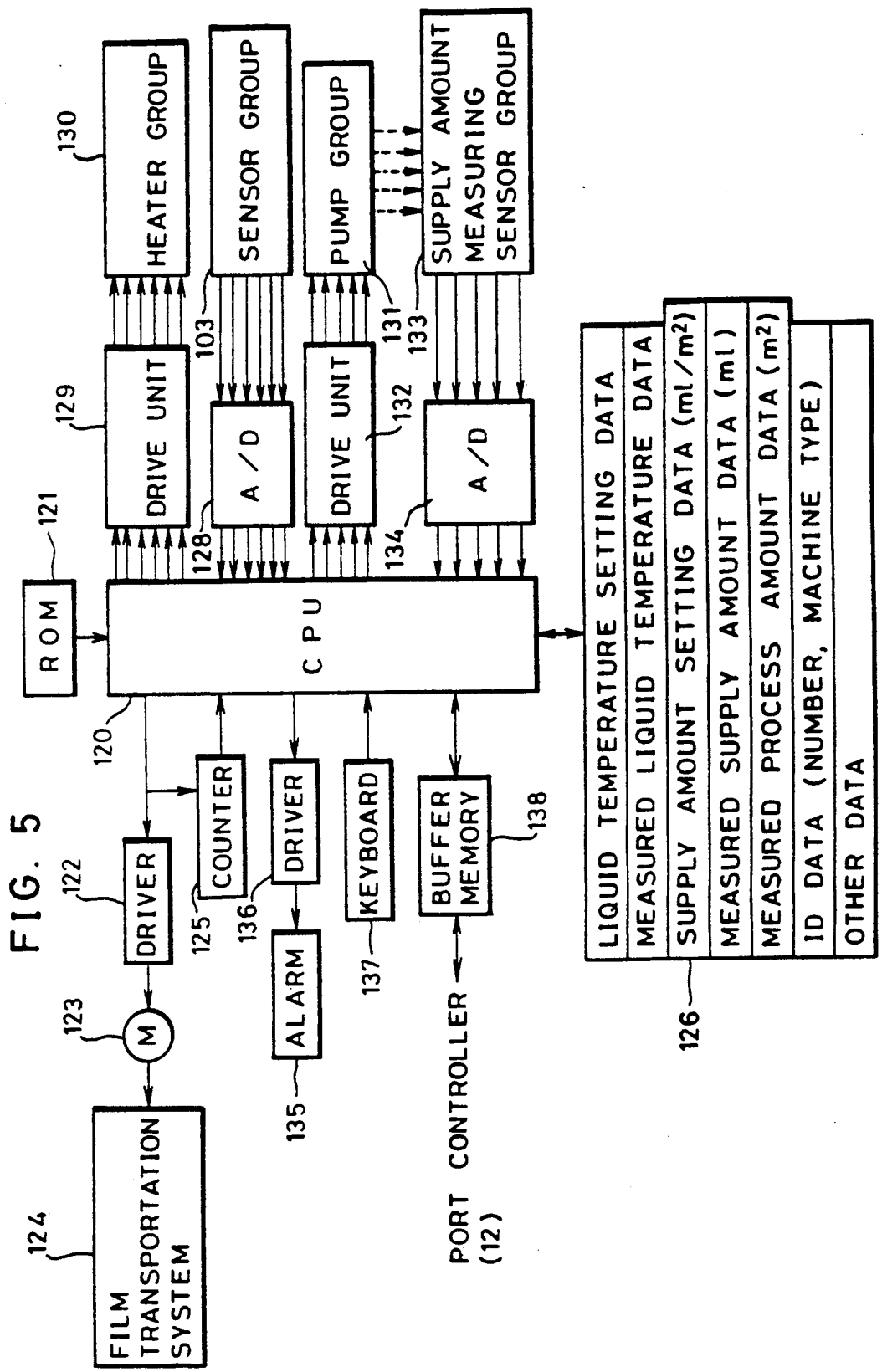
FIG. 5 is a block diagram showing the electric circuit arrangement of the film processor of FIG. 4.

FIG. 5 shows the circuit arrangement of the film processor. CPU 120 controls the circuit elements in accordance with a control program stored in ROM 121. CPU 120 causes a pulse motor 123 to rotate by supplying drive pulses to a driver 122, so that a paper transportation system 124, constructed of a number of rollers shown in FIG. 4, is driven to transport the negative film 91 at a predetermined speed. Since the rotation amount of the pulse motor 122 corresponds to the film processing amount, a counter 125 counts drive pulses after setting a film. The contents of the counter 125 are fetched by a CPU 120 which then obtains the measured processing amount data (the number of processed films for each film type) and writes it in RAM 126.

A temperature sensor group 103, constructed of the six temperature sensors 103a to 103f, measures the solution temperatures within respective processing tanks. The six measured solution temperatures are converted into digital signals by an A/D converter 128 and are supplied to CPU 120 which then writes them in RAM 126 as the measured solution temperature data.

A pump group 131, constructed of the pumps 105, 110 to 113, is driven by a drive unit 132 in accordance with the film processing amount. A supply amount measuring sensor group 133, constructed of five sensors mounted on the pumps, measures the supply amount of each processing solution in accordance with the drive amount of the pumps. The measured supply amount is converted into a digital signal by an A/D converter 134 and written in RAM 126.

An alarm 135, driven by CPU 120 via a driver 136 to generate a sound, light or the like, warns an operator when an abnormal state occurs during the operation of the film processor 11b, or any adjustment failure occurs because of inability of provide automatic adjustment using the personal computer 13.

Setting data and various measured data for operating the film processor 11b in a normal condition are written in RAM 126. These data are fetched by the personal computer 13 via the port controller 12. A keyboard 137 supplies various operational commands and data to CPU 120. A buffer memory 138 is connected between CPU 120 and port controller 12.

Figure 6:
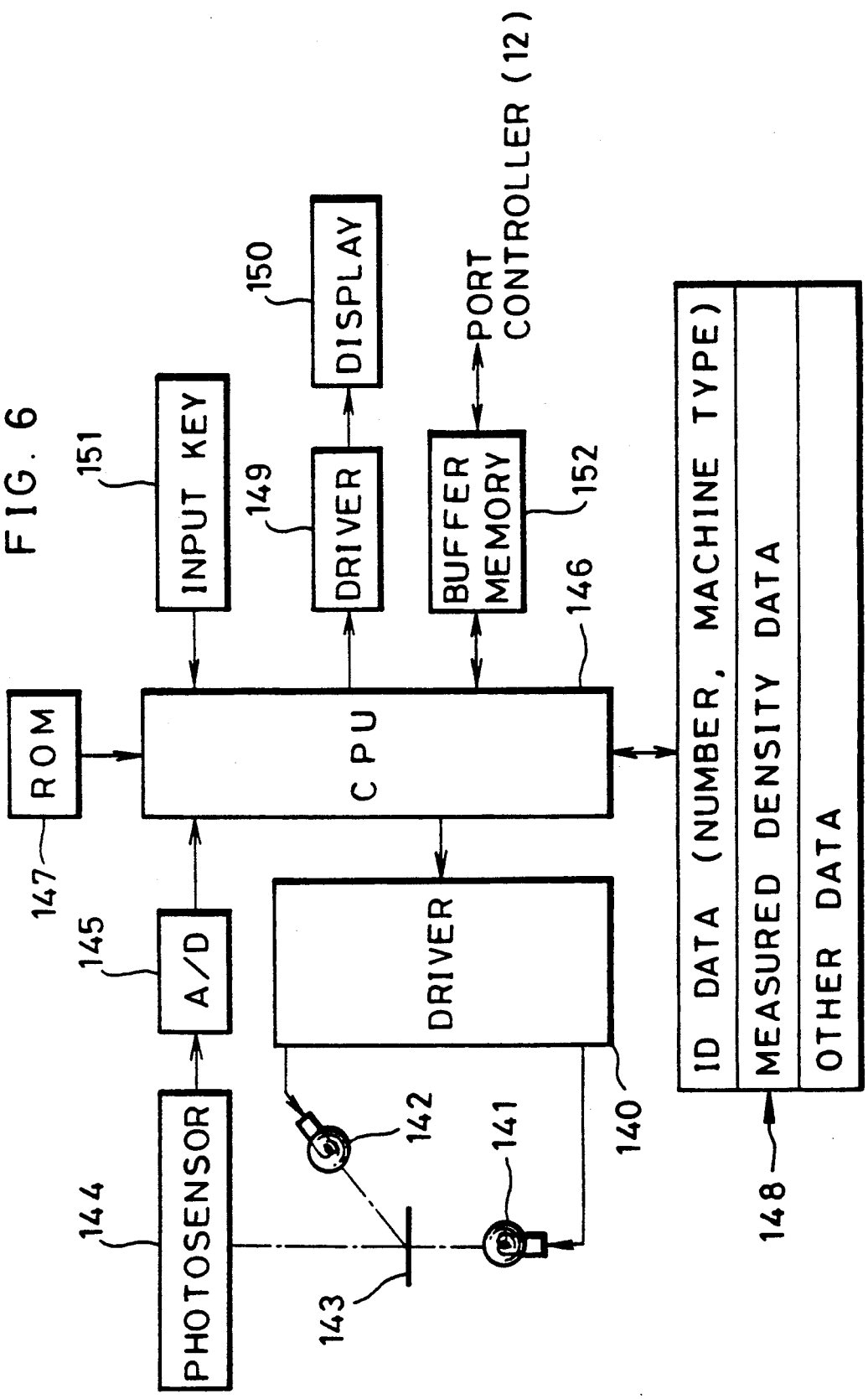
FIG. 6 is a schematic diagram of the densitometer of FIG. 1.

FIG. 6 shows the structure of the densitometer. Two lamps 141 and 142 are connected to a driver 140, the lamp 141 being turned on to measure the transmittance density, and the lamp 142 being turned on to measure the reflection density. The transmitted light or reflected light from a test sample 143 (control strip, test photoprint, or reference photoprint) is measured by a photosensor 144. A signal measured by the photosensor 144 is converted into a digital signal by an A/D converter 145 which is then fetched by CPU 146. This CPU 146 calculates the density in accordance with a program stored in ROM 147, and the calculated density is written in RAM 148 as the measured data. The measured density also is supplied via a driver 149 to be displayed on a display 150. An input key 151 enables input of ID data or the like of the photographic apparatus by which a test sample was made. A buffer memory 152 is connected to the port controller 12.

Figure 7:
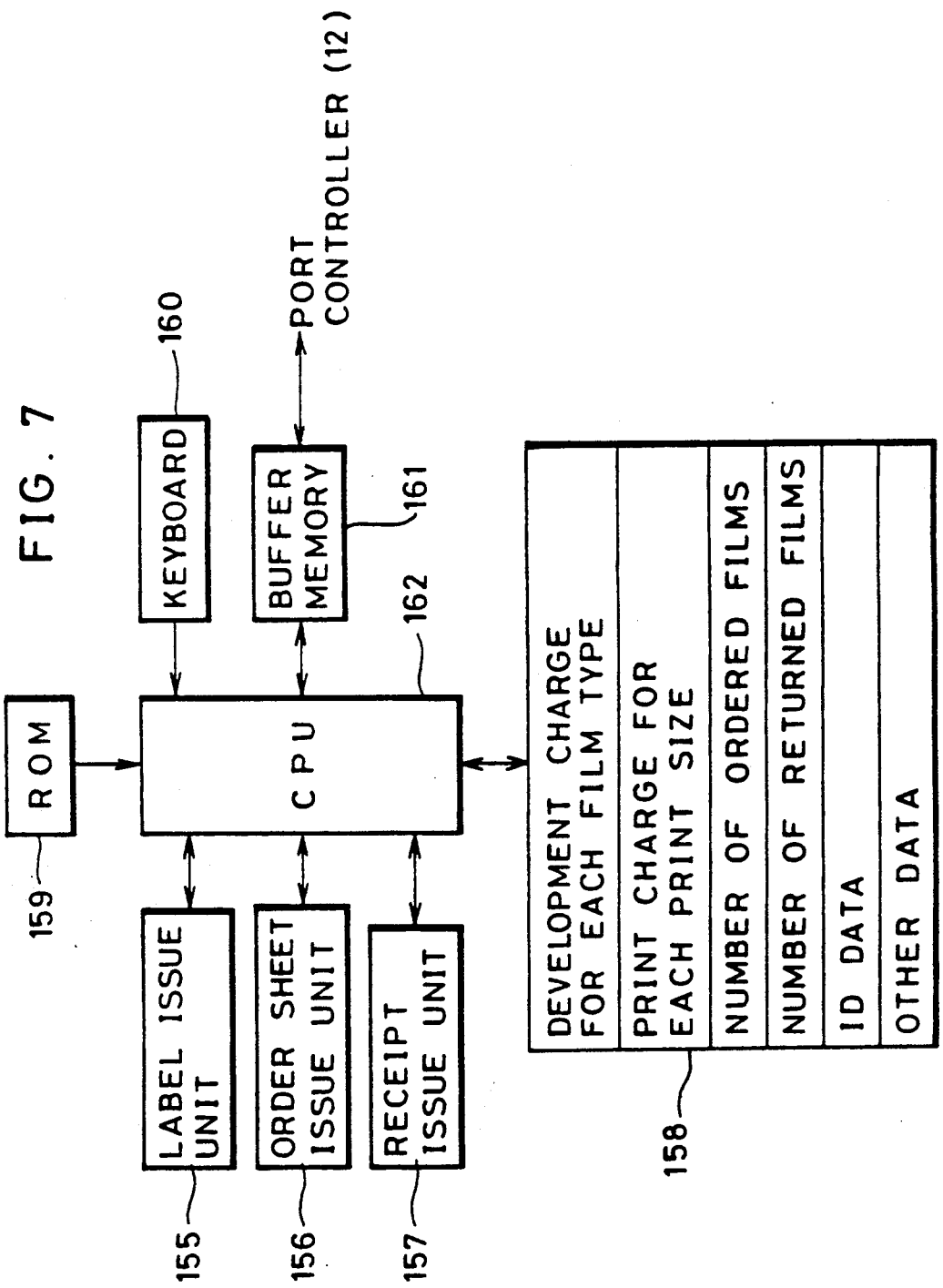
FIG. 7 is a schematic diagram showing the photofinishing reception equipment of FIG. 1.

FIG. 7 shows a photofinishing reception unit which is constructed of a label issue unit 155 for issuing a photofinishing bag and a label with a reception number to be attached to a film cassette, an order sheet issue unit 156 for issuing a photofinishing order sheet, a receipt issue unit 157, a RAM 158 for storing reception data, a ROM 159, a keyboard 160, a buffer memory 161, and a CPU 162. The reception data includes a development charge for each film type, a print charge for each print size, the number of ordered films, the number of returned films, and the like. The charge also includes a charge for each customer and a total charge for all customers.

Figure 8:
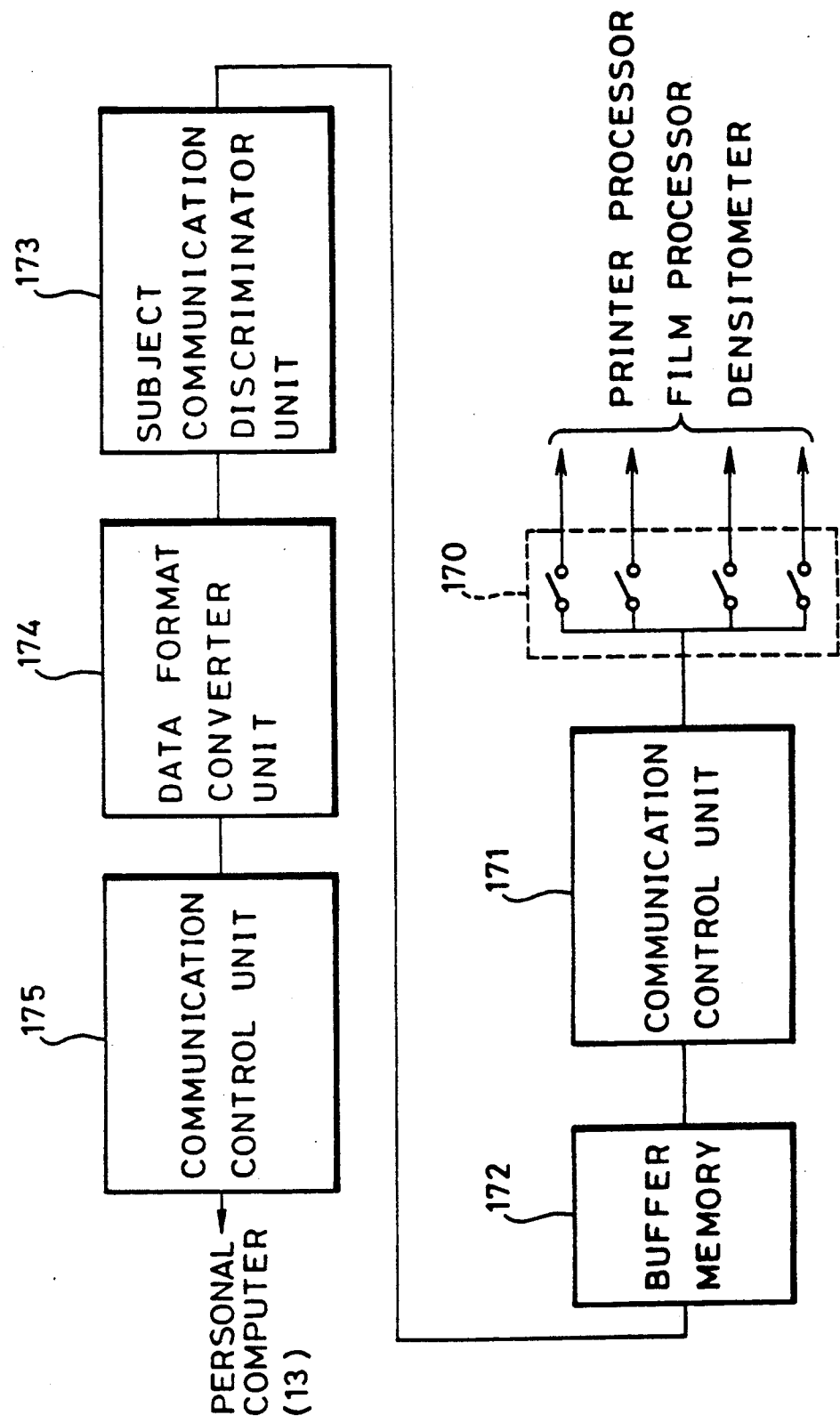
FIG. 8 is a block diagram showing the port controller of FIG. 1.

FIG. 8 shows the structure of the port controller. A switch unit 170 is turned on selectively by a communication control unit 171 to transfer data or commands via the selected switch to the photographic apparatus and densitometer. The communication control unit 171 regulates the communication speed so as to be compatible with the data transfer speed of the photographic apparatus or densitometer, or performs time sharing control when operational data or production data are fetched from each photographic apparatus at predetermined time intervals.

The port controller 12 transfers data or commands by checking an idle time of CPU so as not to hinder the operation of each photographic apparatus. While the photographic apparatus operates, data is transferred irregularly, and data transfer to the personal computer 13 is carried out in an ordinary manner. For this reason, a buffer memory 172 is provided for storing one block of data.

A subject communication discriminator unit 173 stores in advance the correspondence between the connection terminals of the switch unit 170 and the ID data of photographic apparatus connected to the terminals. The stored ID data is compared with the ID data which was fetched from the photographic apparatus together with the operational data, so as to enable determination of whether the operational data was fetched from the subject photographic apparatus which the personal computer has designated. If the ID data are not the same, data is not transferred to the personal computer 13. A data format converter unit 174 converts various formats outputted from the photographic apparatus or densitometer into a predetermined format such as ASCII codes readable by the personal computer 13. On the other hand, commands or data sent from the personal computer 13 are converted into a format readable by each photographic apparatus. A communication control unit 175 responds to a command from the personal computer 13 and transfers the data stored in the buffer memory 172 in blocks and at a predetermined communication speed. It also receives data from the personal computer 13.

Figure 11:
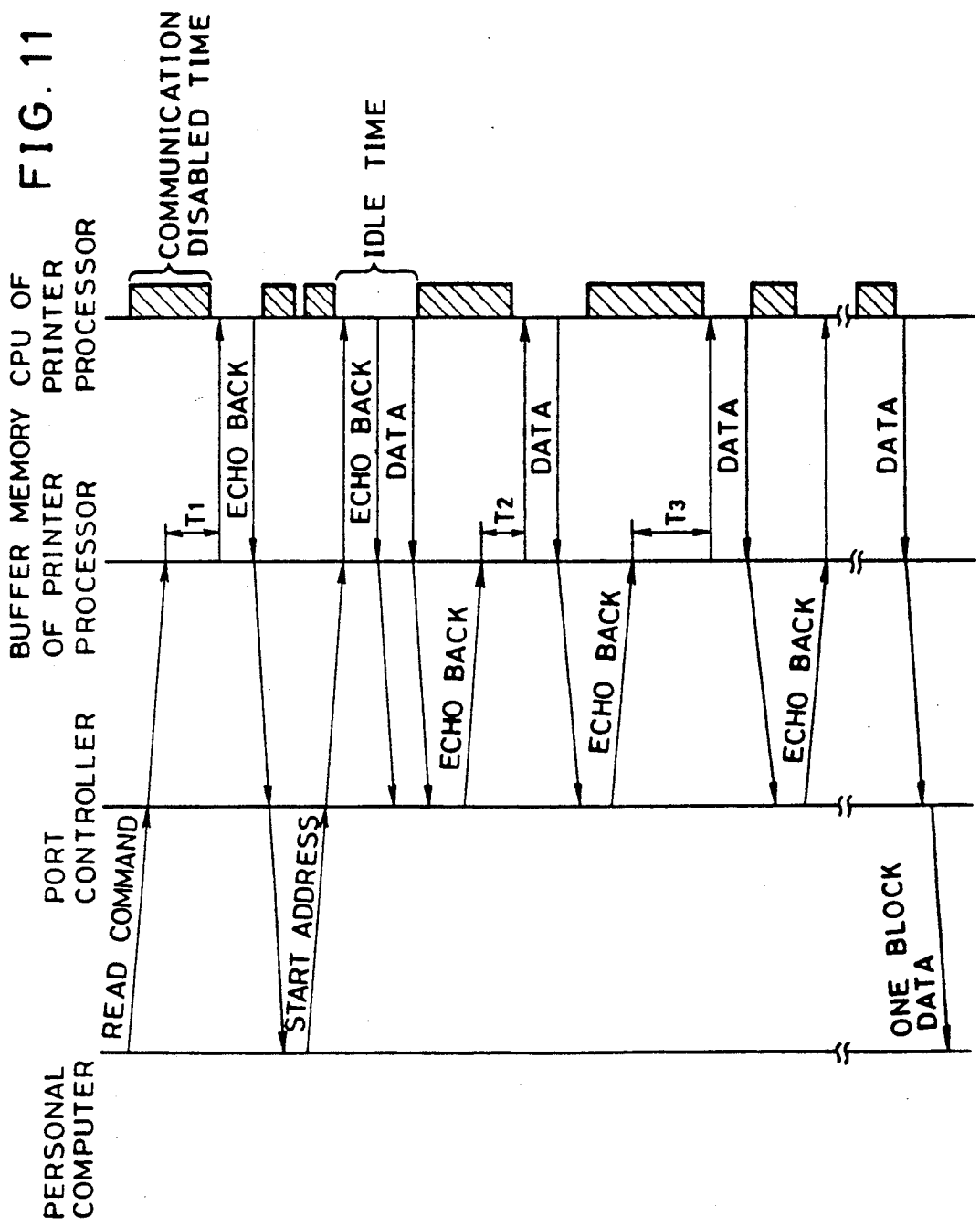
FIG. 11 illustrates a communication state between a port controller and a photographic apparatus.

Referring now to FIG. 11, data communication between the port controller and each photographic apparatus will be described. Data from a particular photographic apparatus or densitometer is fetched into the personal computer 13 via the port controller 12 upon operating the keyboard 16 of the personal computer 13. Alternatively, data under management by each photographic apparatus is fetched automatically at predetermined time intervals in a time sharing manner. Operational conditions, production, and the like are managed using these data.

To fetch data from a photographic apparatus in operation, a CPU of the photographic apparatus is checked to see whether it is idle. That is, if the personal computer 13 requires data, it sends a read command (including ID data of the subject photographic apparatus) to the port controller 12. The communication control unit 175 of the port controller 12 analyzes the received read command to identify the subject photographic apparatus. For example, assuming that the printer processor 11a has been designated, the data format suitable for the printer processor 11a. The communication control unit 171 turns on the switch of the switch unit 170 connected to the printer processor 11a so that the read command is written in the buffer memory 88 of the printer processor 11a via the turned-on switch at the data communication speed of the printer processor 11a.

The hatched portion represents a communication disabled time during which CPU 63 performs printing processes. When CPU 63 is released from the printing process upon the lapse of a buffering time T1, it fetches the read command written in the buffer memory 88. After fetching the read command, CPU 63 writes an echo-back code into the buffer memory 88 representative of the completion of fetching the read command. The communication control unit 171 reads the echo-back code from the buffer memory 88 at a speed corresponding to the data transfer speed of the printer processor 11a. This echo-back code is converted into an ASCII code and is transferred to the personal computer 13.

The personal computer 13 then sends the start address of RAM 69 to the port controller 12. This start address is written in the buffer memory 88 of the printer processor 11a in a procedure similar to the above-described read command. If CPU 63 is idle, the echoback code is sent via the buffer memory 88 to the port controller 12. Next, CPU 63 reads, e.g., one byte of data from RAM 69 at the area designated by the start address, and sends it via the buffer memory 88 to the port controller 12. In a similar manner as above, by using the idle time of CPU 63, one byte data is read sequentially from RAM 69 at the areas following the area designated by the start address, sent to the port controller 12, and written in the buffer memory 172. Reference characters T2 and T3 indicate buffering times.

When one block of data is collected in the buffer memory 172, the subject communication discriminator unit 173 checks whether the collected data is correct with reference to its ID data. This operation is carried out by checking whether the ID data which was fetched together with the one block of data from the printer processor 11a is coincident with the ID data designated by the personal computer 13. If the one block of data is correct, it is read from the buffer memory 172, converted into ASCII codes by the data format converter unit 174, and transferred sequentially to the personal computer 13 via the communication control unit 175. In accordance with the data fetched from the printer processor 11a, the personal computer 13 diagnoses the operational condition, manages the production and consumable goods, and performs other necessary tasks.

The personal computer 13 also can send data to the printer processor 11a to modify the setting data written in the printer processor 11a. This data modification can be carried out in a procedure similar to the above-described data fetching, so the description thereof will be omitted here. Data communication with the film processor 11b, densitometer 11c, photofinishing reception unit 11d, and the like also is carried out in a procedure similar to that of the printer processor 11a.

Figure 12:
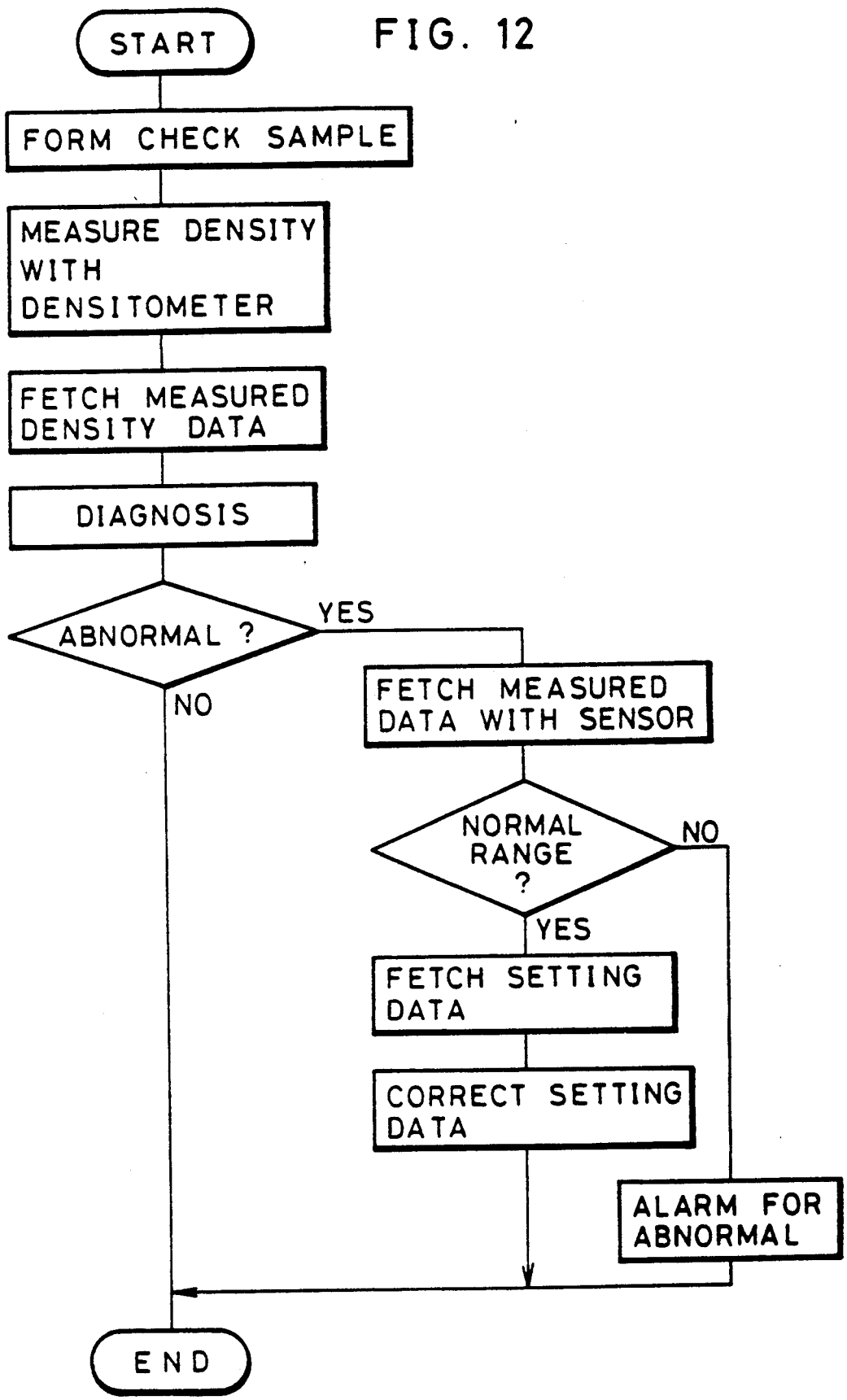
FIG. 12 is a flow chart showing an example of the operational management procedure for a photographic apparatus.

The operational condition management for a photographic apparatus will be described with reference to FIG. 12. To check the operational condition of the processor 24 of the printer processor 11a, the cover (not shown) of the printer processor is opened to set the cassette 48 therein. The leader of the control paper strip 49 is pulled out from the cassette 48 and set to the feed roller pair. Thereafter the cover is closed. When the processor 24 operates, the control paper strip 49 passes through the developing tank 41, fixing tank 42, and rinsing tanks 43a to 43c in that order to undergo the developing process. At the end, it is dried and ejected into the sorter 46 as a check sample.

The check sample is measured with the densitometer 11c. Prior to measuring the density, the ID data of the printer processor which made the check sample is written in RAM 148 by means of the input key 151. After inputting the ID data processor, the check sample is set to the densitometer 11c to measure three color densities. The obtained densities are written in RAM 148 as the measured data. The measured density data is supplied via the port controller 12 to the personal computer 13. Specifically, when the data is sent to the port controller 12, the communication control unit 171 turns on the switch connected to the densitometer 11c and sets the data transfer speed of CPU 146 of the densitometer 11c. Since the densitometer 11c is idle at this time, the block of measured data together with the ID data written in RAM 148 is sent to the port controller 12 and stored in the buffer memory 172. The subject communication discriminator unit 173 compares the stored ID data with the ID data fetched together with the measured data. If the measured data is correct, it is sent to the data format converter unit 174 to convert it into ASCII codes. The communication control unit 175 transfers the data to the personal computer 13 at a speed equal to the data transfer speed of the personal computer 13. In the case of a printer processor with a densitometer built therein, a check sample is automatically measured with the built-in densitometer 45a after the drying process, and the measured density data is written in RAM 69. The measured density data is read and supplied to the personal computer 13 via the port controller 12.

The personal computer 13 analyzes the measured density data and diagnoses the operational condition, in accordance with a management program. For this diagnosis, source data combining for example nine densities is used as [LD$_{(R, G, B)}$, C$_{(R, G, B)}$, Dmin$_{(R, G, B)}$]. R represents red, G represents green, and B represents blue. LD represents a low density (density at a low illumination area) and corresponds to the sensitivity value of a color paper. C represents a contrast which is a difference between a high density (density at a high illumination area) and a low density. Dmin represents a density at an unexposed area and corresponds to a fog value.

If LD, C and Dmin are within a certain range, the operational condition is diagnosed as normal. If they are out of the range, the causes of abnormal conditions of the processor 24 are analyzed. The personal computer 13 has abnormal source data and knowledge data composed of the causes and countermeasures of abnormal conditions. Therefore, through a pattern matching process, the data most analogous to the source data of a check sample is derived, and the causes and countermeasures corresponding to the derived data are obtained. An example of a method of analyzing causes is detailed in copending application Ser. No. 07/450,981 filed on Dec. 15, 1989.

After determining the causes and countermeasures of abnormal conditions, the printer processor which made the check sample is designated in accordance with the ID data to supply measured data associated with the causes to the personal computer 13. Measured data associated with the causes generally include, in addition to the temperature of a processing solution, pH of a developing solution, a concentration of potassium bromide, a height of solution surface, and the like. It is possible that no sensor would be provided to measure some of these data. If such data is necessary despite the lack of the corresponding sensor, the personal computer 13 generates alarm data and sends it to the printer processor 11a to actuate the alarm 86.

A solution temperature sensor is provided in this embodiment. Therefore, the following description is directed to the case where the temperature of the developing solution for example is a cause of trouble in development so that a countermeasure must be carried out to change the temperature of the developing solution by a predetermined amount. The port controller 12 accesses the printer processor 11a to be checked in accordance with an instruction from the personal computer 13, and fetches the measured solution temperature data and ID data stored in RAM 69 and stores them in the buffer memory 172 of the port controller 12. After checking the ID data and confirming that the temperature data is correct, the data format is converted and thereafter, the measured solution temperature data of the developing solution is transferred to the personal computer 13.

If the measured temperature data of the developing solution is not within the normal range, the personal computer 13 diagnoses that the temperature sensor or heater is in trouble, and sends alarm data to the printer processor 11a. If the measured solution temperature data is within the normal range, the solution temperature setting data stored in RAM 69 is fetched via the port controller 12. The solution temperature setting data then is raised or lowered by a designated amount and written in RAM 69 of the printer processor 11a. The printer processor 11a powers the heater to set the solution temperature to the corrected solution temperature in accordance with the corrected solution temperature setting data. If the cause originates from the supply amount of the processing solution such as the developing solution, the measured supply amount data and setting data of the developing solution are fetched by the personal computer 13 in accordance with the above-described procedure, and the corrected data is written in RAM 69. The operational condition of the film processor 11b is checked in a similar manner described above, so the description thereof will be omitted.

Next, checking the operational condition of the printer 23 will be described. To check the light amount, the control negative film (Bull's eye) 36 is used, and its base portion where a Bull's eye is not formed is set to the film carrier 29. Light passed through the base portion is measured with the photosensor 37, converted into a digital signal, and written in RAM 69.

Thereafter, the measured lamp light amount data is fetched by the personal computer 13 via the port controller 12 in the manner as described above. The personal computer 13 judges whether the measured lamp light amount is within the normal range. If it is not within the normal range, alarm data is transferred to the printer 23. If the amount is within the normal range, lamp voltage data is fetched from RAM 69. The lamp voltage is corrected in accordance with a deviation of light amount, and the corrected lamp voltage data is written in RAM 69. The corrected lamp voltage is applied to the lamp 30 to adjust the lamp light amount to a predetermined value.

If the exposure condition is set or corrected after checking the lamp light amount, three Bull's eyes (normal exposure, overexposure, and underexposure) of the control negative film 36 are printed on a color paper 26 which is then developed by the processor unit 24 to obtain check samples including a normal-exposure photoprint, an over-exposure photoprint, and an under-exposure photoprint. After the ID data of the printer processor 11b is entered, three photoprints each are set to the densitometer 11c to measure the three color densities of each photoprint. The measured density data is fetched by the personal computer 13 via the port controller 12.

Three reference photoprints (normal-exposure, over-exposure, and under-exposure) having properly printed Bull's eyes of the control negative film have been supplied by a film maker previously. The three reference photoprints each are set to the densitometer 11c to measure three color densities. The measured density data is transferred to the personal computer 13 via the port controller 12. It is sufficient if this density measurement is carried out once, except a particular case. Accordingly, if the density measurement of the reference photoprints has finished already, it can be omitted.

The personal computer 13 compares the density of the normal-exposure reference photoprint with that of the newly printed normal-exposure photoprint to obtain a density difference therebetween. A corrected balance value is calculated in accordance with this density difference and a balance value previously fetched from RAM 62. The corrected balance value is transferred to the printer processor 11a and written in RAM 69. Similarly, the over-exposure reference photoprint is compared with the over-exposure photoprint, and the corrected over-exposure slope value is calculated from the present over-exposure slope value. The corrected under-exposure slope value is obtained in a similar manner. These corrected slope values are written in RAM 69. In the above manner, the personal computer 13 corrects the exposure condition setting data (balance value, slope value). It is apparent that the exposure condition can be set and corrected by operating the keyboard 87 of the printer processor as conventional.

It also is possible to check the operational conditions of the printer processor 11a and film processor 11b by operating the keyboard 16 of the personal computer 13, fetching various operational data (setting data, measured data, and the like) written in RAM 69 of the printer processor 11a and in RAM 126 of the film processor 11b, and displaying the fetched operational data on the monitor 20. Furthermore, the personal computer 13 functions to fetch the operational data of each photographic apparatus at predetermined time intervals automatically to monitor whether the heaters or pumps, for example, are operating normally or so as to store the operational data in a floppy disk or the like as the operational history data. Still further, the production management for each photographic apparatus becomes possible by collecting the film developing amount data and printing the amount data at predetermined time intervals, e.g., every day. The sale management for print charges can be conducted by fetching the data from the photofinishing reception unit 11d and supplying it into the personal computer 13.

Figure 13:
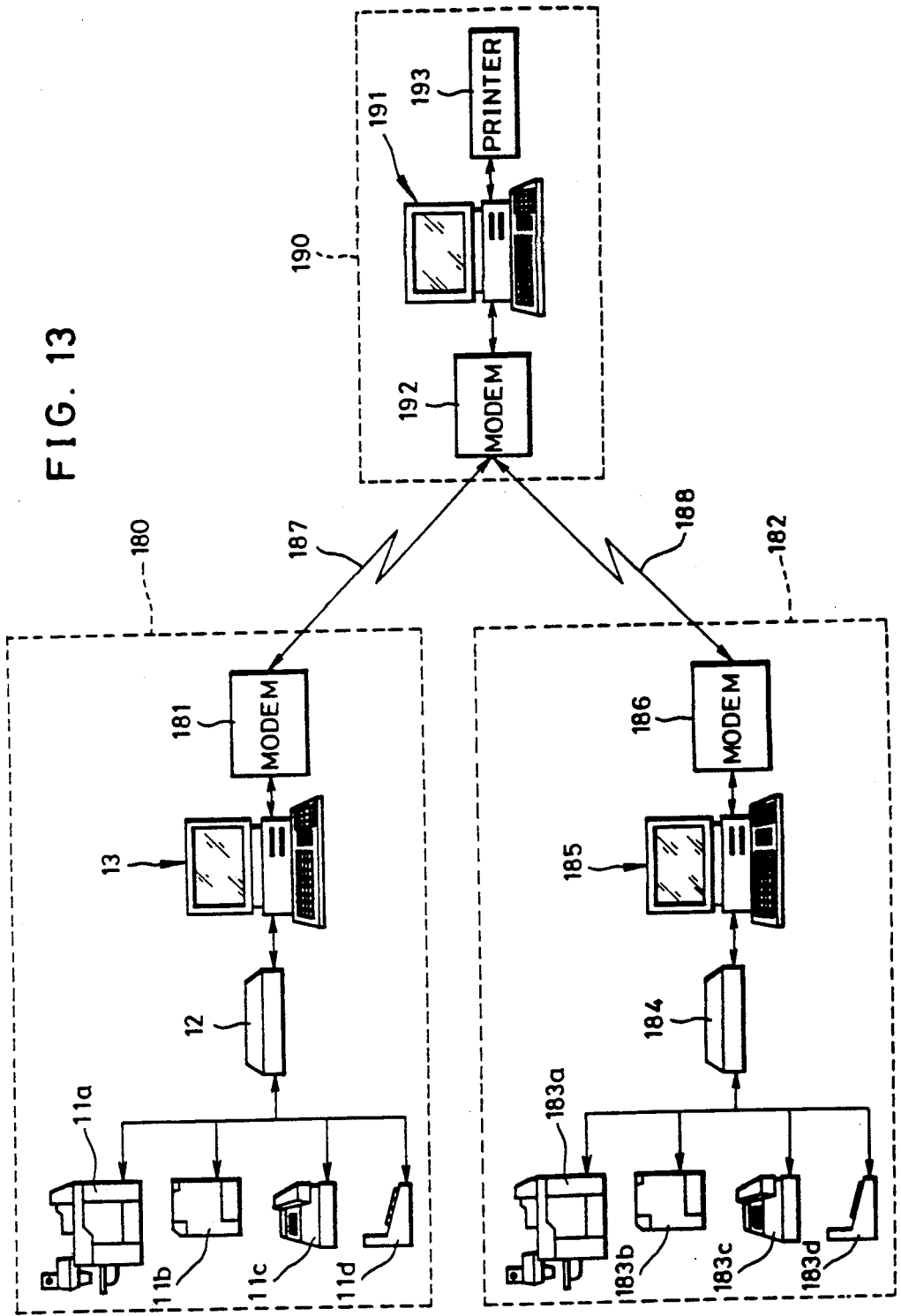
FIG. 13 illustrates an embodiment wherein the headquarters and a plurality of minilab shops are connected via communication lines.

FIG. 13 shows an embodiment wherein the headquarters manages the transactions of a plurality of minilab shops collectively. Minilab shops often are constructed as a chain, so that it is convenient to connect the headquarters with the minilab shops by a computer network. In this embodiment, a personal computer 13 of a minilab shop 180 is used as a sub-computer which is connected to a modem 181. A minilab shop 182 has the same system. The headquarters 190 are provided with a main computer 191, a modem 192, and a printer 193. The modem 192 is connected to the modems 181 and 186 of the minilab shops 180 and 182 via communication lines 187 and 188, respectively. A high level personal computer is used as the main computer 191 in which a management program is stored. A low level inexpensive personal computer is used as the sub-computers 13 and 185.

In this system, the headquarters 190 can manage the business transactions of the plurality of minilab shops 180 and 182. Therefore, it is convenient if the distance between the headquarters 190 and minilab shops 180 and 182 is too long to allow easy spatial transfer. Since the operational condition of the photographic apparatus of each minilab shop can be kept the same, the same quality can be retained between at each minilab shops of a chain.

Figure 14:
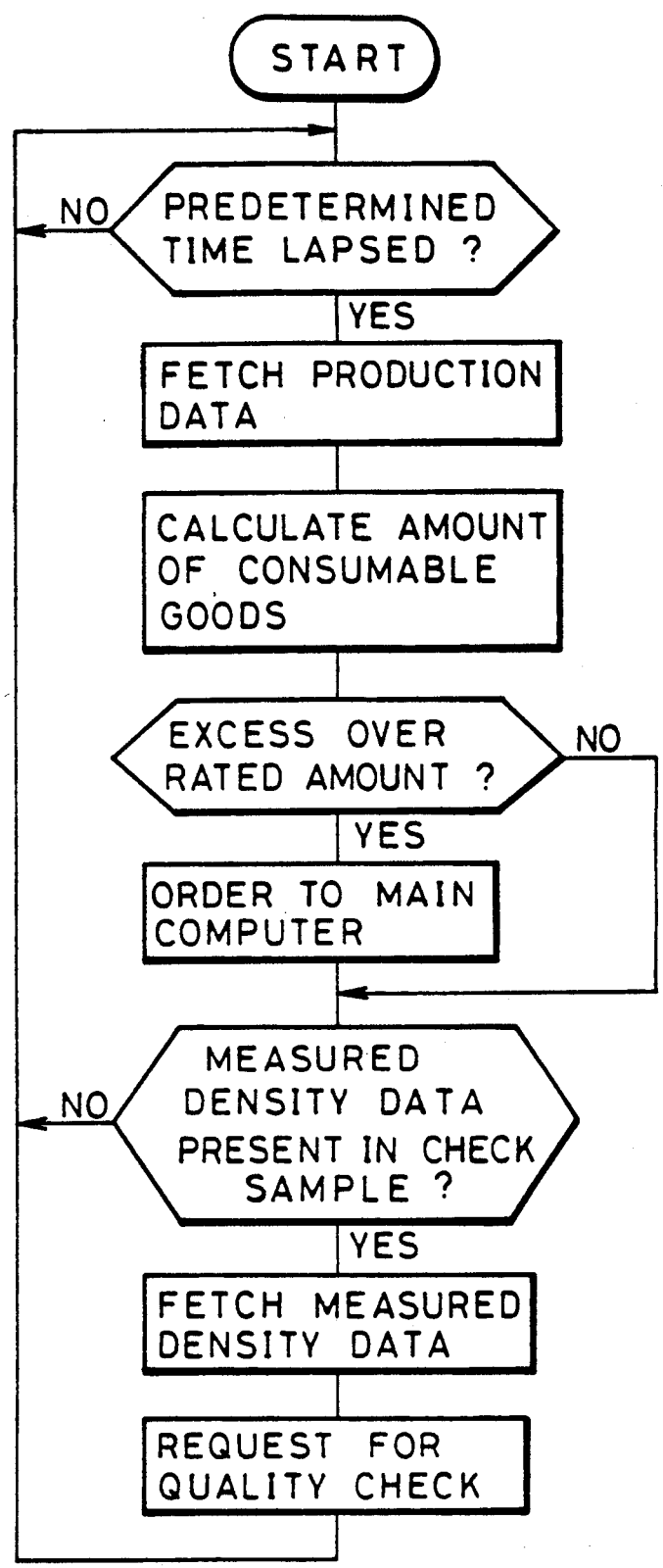
FIG. 14 is a flow chart showing the tasks in a sub-computer.
Figure 15:
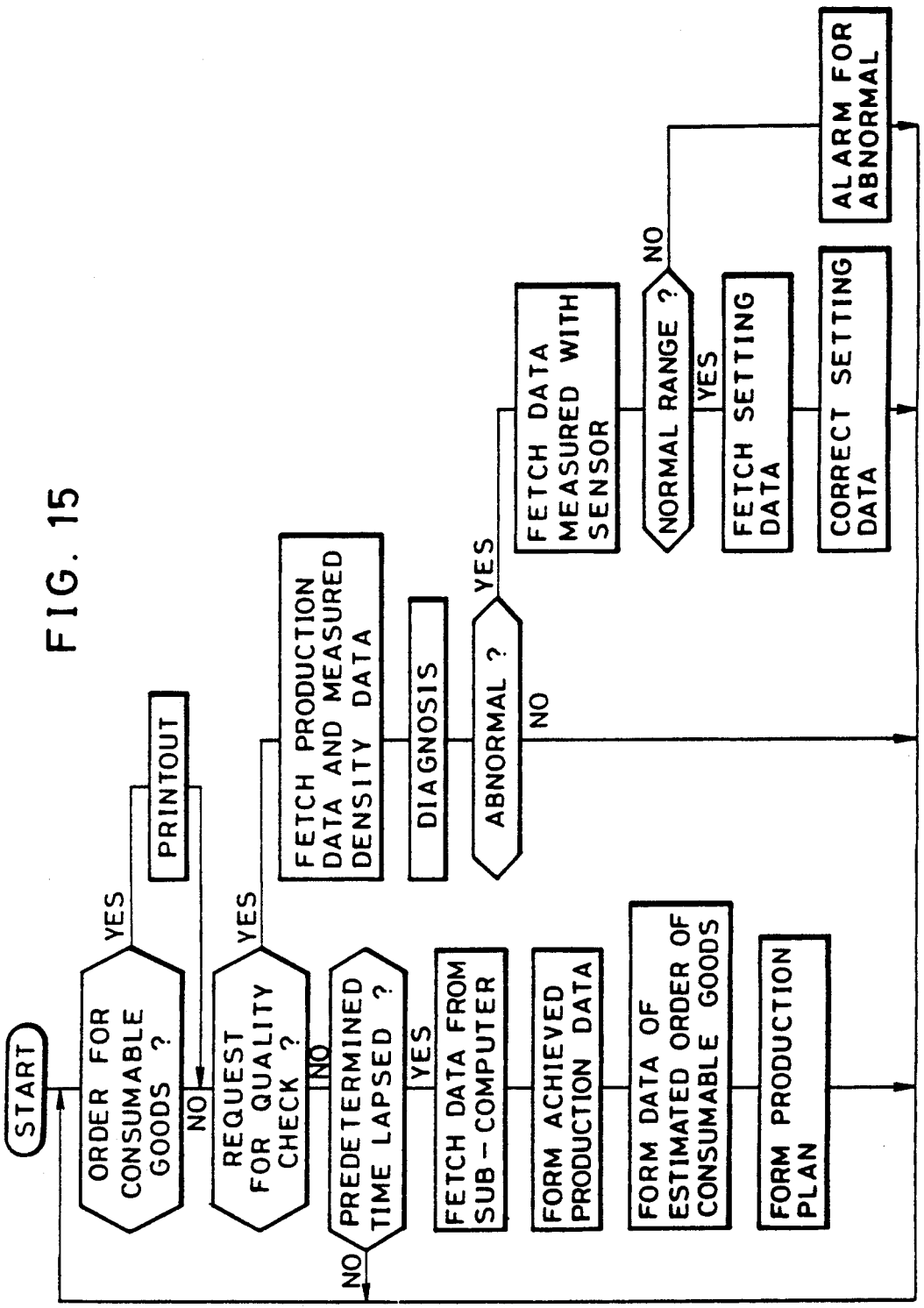
FIG. 15 is a flow chart showing the tasks in a main computer.

The collective management of this system will be detailed further with reference to FIGS. 14 and 15. As shown in FIG. 14, the sub-computer fetches sequentially the production data written in RAM of each photographic apparatus at predetermined time intervals in a time sharing manner. For example, from a printer processor, the sub-computer fetches a paper processing amount for each paper type, and the number of prints (the number of prints for each print size and each film type). From a film processor, the sub-computer fetches the number of processed films for each film type. The sub-computer processes the production data of each photographic apparatus to obtain the primary production management data such as the production amount per period. In accordance with the production data, the sub-computer calculates the consumed amount of consumable goods such as paper, processing solution, print ink ribbon, and the like. When the consumed amount of consumable goods exceeds the rated amount, the sub-computer automatically orders the consumable goods from the main computer 191 at the headquarters 190 via the communication line. The rated amount is determined for each of the consumable goods while taking into consideration the delivery time and consumed amount at each photographic apparatus. The order amount is determined in a similar manner.

The photofinishing reception unit 11d stores as its reception data the development charge, print charge, number of ordered films, and number of returned films. This reception data also is fetched by the sub-computer at predetermined time intervals.

As described previously, to check the photofinishing quality (operational condition) of the printer processor, a check sample is made to measure the density thereof with a densitometer. The measured density data is fetched by the sub-computer via the port controller. After fetching the measured density data, the sub-computer requests the main computer 191 to check the quality.

Referring to the flow chart of FIG. 15 showing the tasks by the main computer, when an order of consumable goods is given from the sub-computer, the main computer 191 of the headquarters 190 prints out an order sheet from a printer 193. In accordance with the order sheet, consumable goods are delivered at right time from the headquarters 190. The main computer 191 fetches from each sub-computer the production data and reception data at predetermined time intervals, e.g., every day. In accordance with the fetched production data, the main computer 191 generates the achieved production data, estimated consumable goods order data, production planning data, and the like, respectively for each minilab shop and for all minilab shops. In accordance with the fetched reception data, the main computer 191 generates the balance sheet for each minilab shop and for all minilab shops.

Upon reception of a quality check from the sub-computer, the main computer 191 fetches at high speed the measured data and production data managed by the sub-computer via the communication line. While taking into consideration the production data, the measured density data is analyzed to diagnose the photofinishing quality. If the diagnosed results are abnormal, the setting data is corrected or an alarm is generated from the buzzer, as described with FIG. 12. At the printer unit of the printer processor, similar diagnosis and countermeasure are provided.

If the main computer 191 is connected on-line to the main frame computer of a film maker or a wholesale dealer of photographic materials, it becomes possible to obtain the latest exposure condition setting data or the like from the film maker or wholesale dealer. If the production data such as a printing amount is sent to the film maker or the like via the communication line, the stock amount of consumable goods at the headquarters can be requested to be managed by the film maker, thereby minimizing the stock cost. On the other hand, the film maker can obtain various information from users so that such information can help the production planning and commodity development.

While the above-described embodiments relate to a minilab, the present invention also is applicable to a large lab. While the invention has been described in detail above with reference to preferred embodiments, various changes and modifications within the scope and spirit of the invention will be apparent to people of working skill in this technological field. Thus, the invention should be considered as limited only by the scope of the appended claims.

What is claimed is:

1. A management system for managing the operational condition of at least one photographic apparatus remotely, said system comprising the following steps:
    connecting said at least one photographic apparatus and a separate, independent densitometer to a computer;
    obtaining measured density data by measuring a check sample, made as a final product by said photographic apparatus, with said densitometer;
    diagnosing the operational condition of said photographic apparatus by fetching said measured density data into said computer and by analyzing said measured density data;
    if said operational condition is abnormal, determining a countermeasure by fetching associated data from said photographic apparatus; and
    adjusting the operational condition of said photographic apparatus by transferring said countermeasure to said photographic apparatus, if said operational condition is abnormal.

2. A management system according to claim 1, wherein said at least one photographic apparatus includes a printer processor and a film processor.

3. A management system according to claim 2, wherein said computer comprises a personal computer having a management program stored therein.

4. A management system according to claim 3, wherein said associated data includes a temperature and surface height of a photofinishing solution, and exposure condition setting data.

5. A management system according to claim 4, wherein said printer processor, said film processor, and said densitometer are connected to said computer via a port controller.

6. A management system according to claim 5, wherein said port controller comprises:
    a switch unit for selecting one device from said printer processor, said film processor, and said densitometer, for performing data communication;
    a first communication control unit for finding an idle time of a CPU incorporated in said selected device, and performing data communication at the data transfer speed of said CPU during said idle time;

a buffer memory for storing said data fetched irregularly from said selected device;

a subject communication discriminator unit for discriminating whether said data in said buffer memory to be transferred to said personal computer is the data of said selected device requested by said personal computer;

a data format converter unit for converting said data read from said buffer memory into a data format of said personal computer; and a second communication control unit for transferring said format-converted data in blocks to said personal computer at the data transfer speed of said personal computer.

7. A management system for remotely managing the operational conditions of photographic apparatus at a plurality of lab shops, said system comprising the following steps:

connecting at least one of said photographic apparatus and a separate, independent densitometer to a sub-computer installed at each of said lab shops;

fetching into said sub-computer the production data of said photographic apparatus and the density data of a check sample, produced as a final product by one of said photographic apparatus, measured with said densitometer;

transferring on-line said data fetched into said sub-computer to a main computer at a central location via a remote communication line; and diagnosing the photofinishing quality in said main computer in accordance with said measured density data by referring to said production to said production data.

8. A management system according to claim 7, wherein said production data includes an amount of processed paper and a number of prints.

9. A management system according to claim 7, further comprising the steps of performing production management by fetching into said sub-computer the production data of said photographic apparatus, and judging the consumed state of consumable goods in accordance with said production data, for ordering on-line said consumable goods to said main computer at said headquarters via said communication line if more than a predetermined amount of said consumable goods are consumed.

10. A management system according to claim 9, wherein said consumable goods include said paper and a photofinishing solution.

11. A management system according to claim 9, further comprising the steps of sending the diagnosed results of said quality of said sub-computer at said lab shop requesting to diagnose said quality, and automatically adjusting said photographic apparatus via said sub-computer.

12. A management system according to claim 11, wherein said at least one photographic apparatus includes a printer processor and a film processor.

13. A management system according to claim 12, wherein said printer processor, said film processor, and said densitometer are connected to said sub-computer via a port controller.

14. A management system according to claim 13, wherein said port controller comprises:

a switch unit for selecting one device from said printer processor, said film processor, and said densitometer, for performing data communication;

a first communication control unit for finding an idle time of a CPU incorporated in said selected device, and performing data communication at the data transfer speed of said CPU during said idle time;

a buffer memory for storing said data fetched irregularly from said selected device;

a subject communication discriminator unit for discriminating whether said data in said buffer memory to be transferred to said sub-computer is the data of said selected device requested by said sub-computer;

a data format converter unit for converting said data read from said buffer memory into a data format of said sub-computer; and a second communication control unit for transferring said format-converted data in units of block to said sub-computer at the data transfer speed of said sub-computer.

15. A management system for remotely managing the production conditions at a plurality of lab shops, said system comprising the following steps:

connecting at least one photographic apparatus, which includes a printer processor and a film processor, to a sub-computer installed at each of said lab shops;

performing production management by fetching into said sub-computer the production data of said photographic apparatus; and determining the consumed state of consumable goods in accordance with said production data for ordering on-line said consumable goods to a main computer at the headquarters via a communication line if a predetermined amount of said consumable goods are consumed.

16. A management system according to claim 15, wherein said production data includes an amount of processed paper and the number of prints.

17. A management system according to claim 15, wherein said printer processor, said film processor, and said densitometer are connected to said sub-computer via a port controller.

18. A management system according to claim 17, wherein said port controller comprises:

a switch unit for selecting one device from said printer processor, said film processor, and said densitometer, for performing data communication;

a first communication control unit for finding an idle time of a CPU incorporated in said selected device, and performing data communication at the data transfer speed of said CPU during said idle time;

a buffer memory for storing said data fetched irregularly from said selected device;

a subject communication discriminator unit for discriminating whether said data in said buffer memory to be transferred to said sub-computer is the data of said selected device requested by said sub-computer;

a data format converter unit for converting said data read from said buffer memory into a data format of said sub-computer; and a second communication control unit for transferring said format-converted data in units of block to said sub-computer at the data transfer speed of said sub-computer.

19. A port controller interposed between a computer and a plurality of photographic apparatus for performing data communication therebetween, said port controller comprising:

a switch unit for selecting one of said plurality of photographic apparatus, for performing data communication;

a first communication control unit for finding an idle time of a CPU incorporated in said selected photographic apparatus, and performing data communication at the data transfer speed of said CPU during said idle time;

a buffer memory for storing said data fetched irregularly from said selected photographic apparatus;

a subject communication discriminator unit for discriminating whether said data in said buffer memory to be transferred to said computer is the data of said selected photographic apparatus requested by said computer;

a data format converter unit for converting said data read from said buffer memory into a data format of said computer; and a second communication control unit for transferring said format-converted data in units of block to said computer at the data transfer speed of said computer.

* * * * *